5 Sheets—Sheet 2.

F. BAYLIES, G. P. & J. M. SLADE.
Calico-Printing Machine.

No. 221,388. Patented Nov. 11, 1879.

Witnesses
E. L. Sherman
H. H. Isaacs

Inventors
Franklin Baylies
George P Slade
J Morgan Slade
by their Atty W C Hicks 5 Sheets—Sheet 3.
F. BAYLIES, G. P. & J. M. SLADE.
Calico-Printing Machine.
No. 221,388. Patented Nov. 11, 1879.
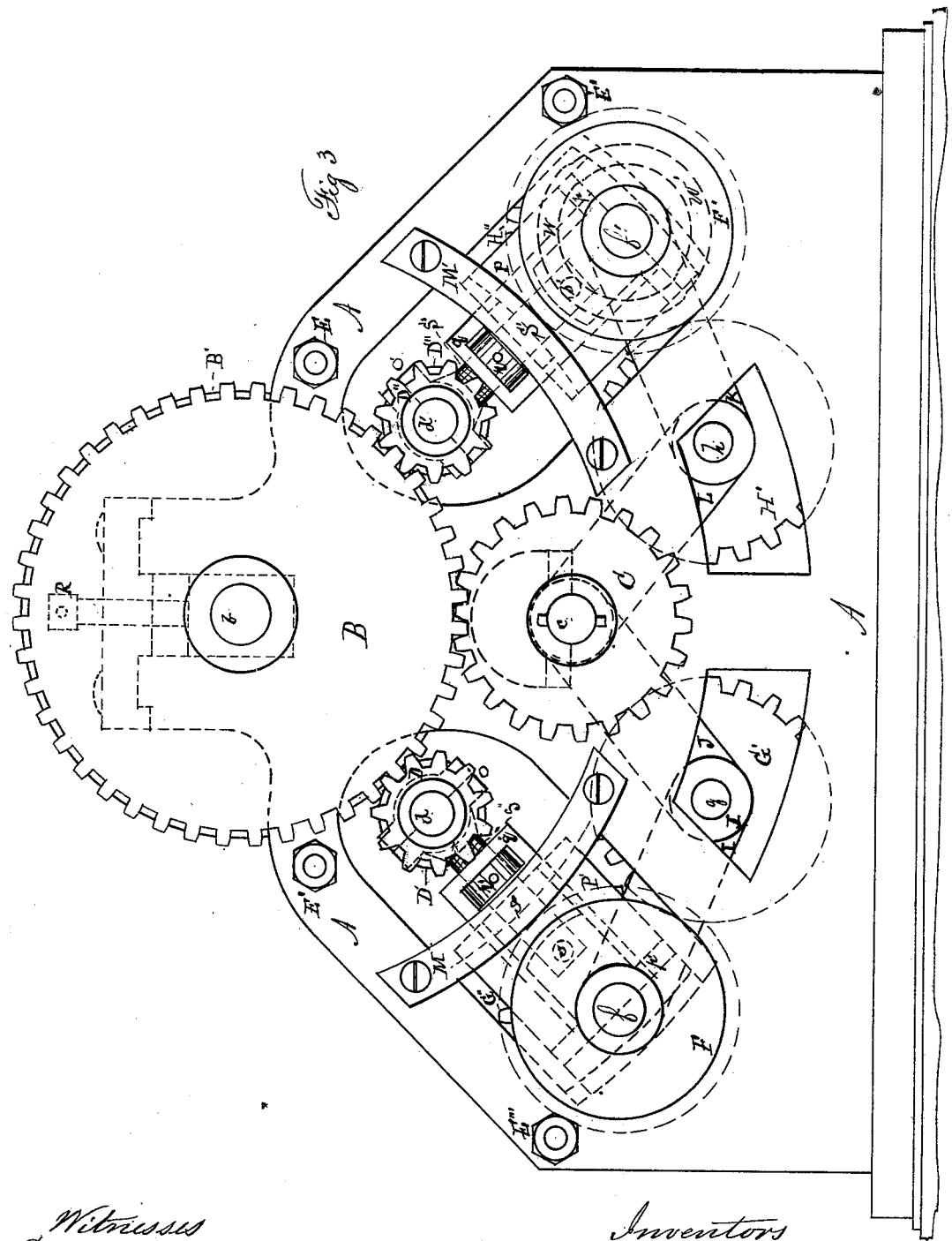

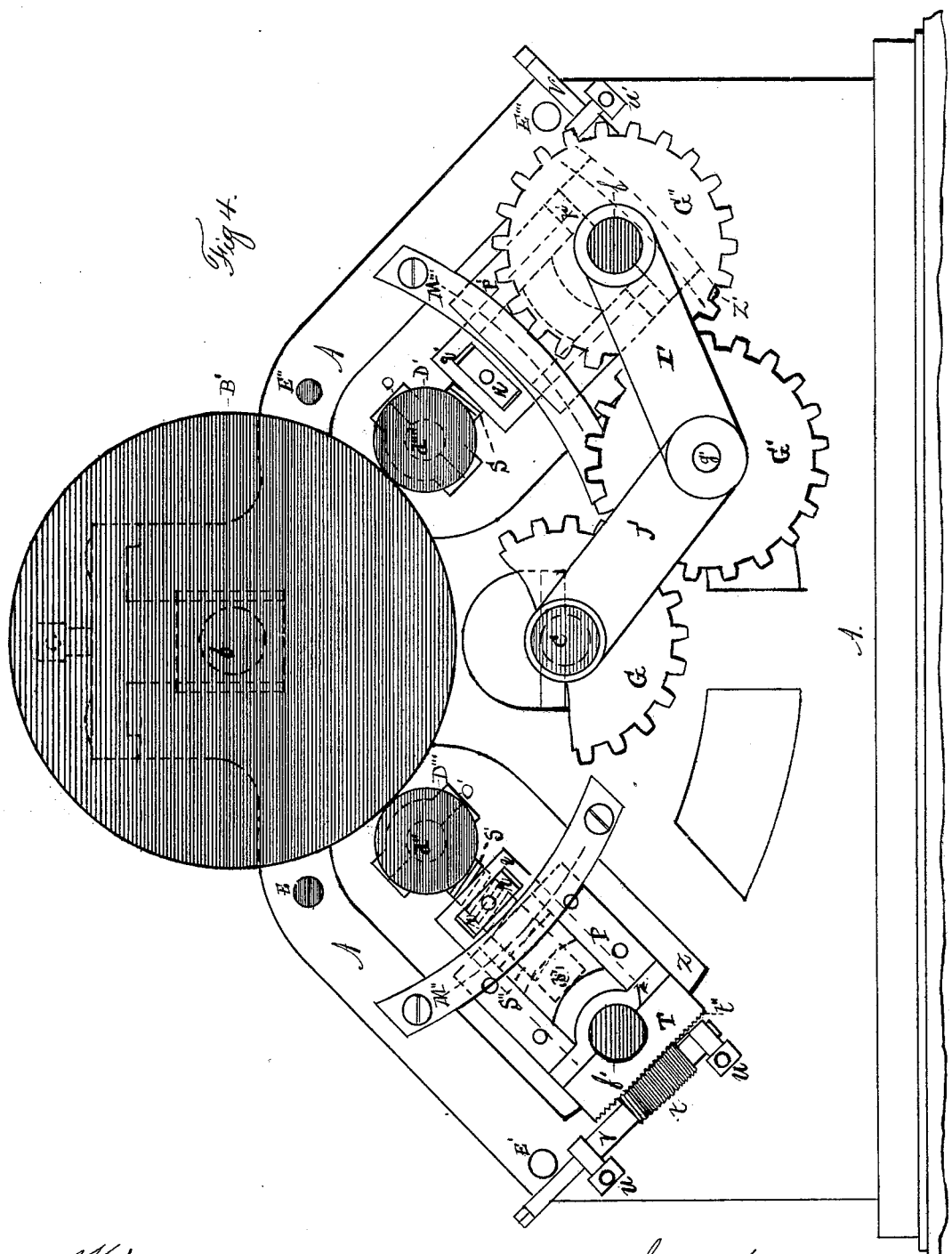

5 Sheets—Sheet 5.
F. BAYLIES, G. P. & J. M. SLADE.
Calico-Printing Machine.
No. 221,388. Patented Nov. 11, 1879.
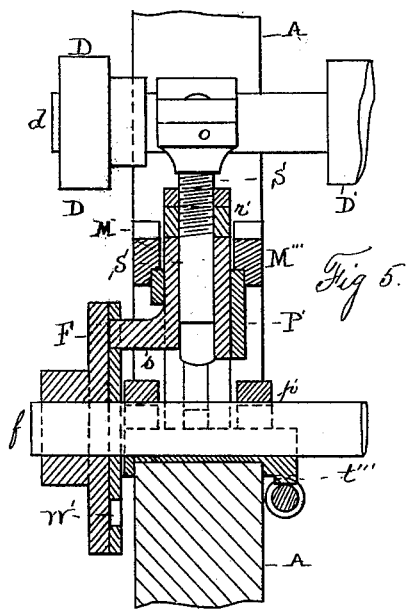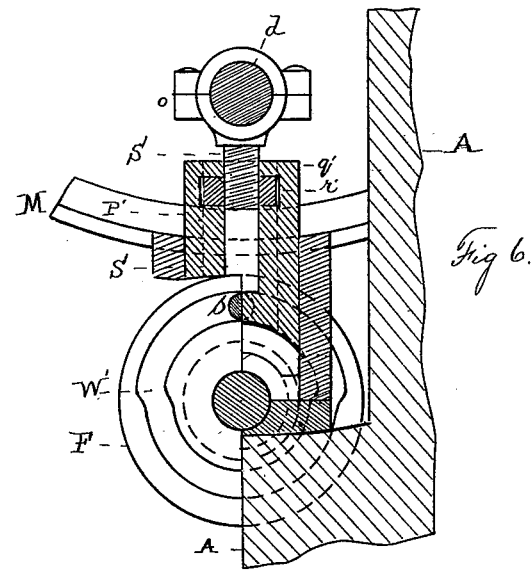

UNITED STATES PATENT OFFICE.

FRANKLIN BAYLIES, GEORGE P. SLADE, AND J. MORGAN SLADE, OF NEW YORK, N. Y.

IMPROVEMENT IN CALICO-PRINTING MACHINES.

Specification forming part of Letters Patent No. 221,388, dated November 11, 1879; application filed July 11, 1879.

*To all whom it may concern:*

Be it known that we, FRANKLIN BAYLIES, GEORGE P. SLADE, and J. MORGAN SLADE, all of the city, county, and State of New York, have made a joint invention of Improved Mechanisms for Printing Calicoes and other Fabrics; and we hereby declare that the following is a full, clear, and exact description and specification of the same, reference being had to the annexed drawings, making part thereof.

Our joint invention relates to the class of machines used for printing designs by means of engraved rolls upon the surfaces of fabrics, such as calicoes, paper, and the like, as they pass continuously between the contiguous surfaces of a drum and engraved rolls, revolving in a suitable frame, and brought toward each other at intervals of time in such a manner as to transfer to the material the figures or designs so engraved either by means of color or by pressure alone.

Our invention consists in certain combinations of mechanisms, which combinations are specifically set forth in the claims, by means of which printing-rolls are revolved and automatically withdrawn from and brought in contact with the material to be printed with such accuracy and positiveness that continuous designs or figures are transferred to its surface and extend over a much greater length of surface than can be done by one or more rolls of the same size revolving in continuous contact with the material to be printed.

Our joint invention enables us to print a design equal in length to the circumference of two, three, or four (or more) rolls before repeating, since each roll transfers its part of the design to the fabric at different points; but they are so accurately connected as to make one continuous design equal to the sum of the circumferences of the rolls before they are drawn away. After a fresh unprinted surface is presented, the rolls are again moved up and the design is repeated, each roll, as before, printing its part of the continuous design.

In order that persons skilled in the art may understand, make, and use our joint invention, we will proceed to describe the manner in which we have embodied it, referring to the annexed drawings, in which—

Figure 1:
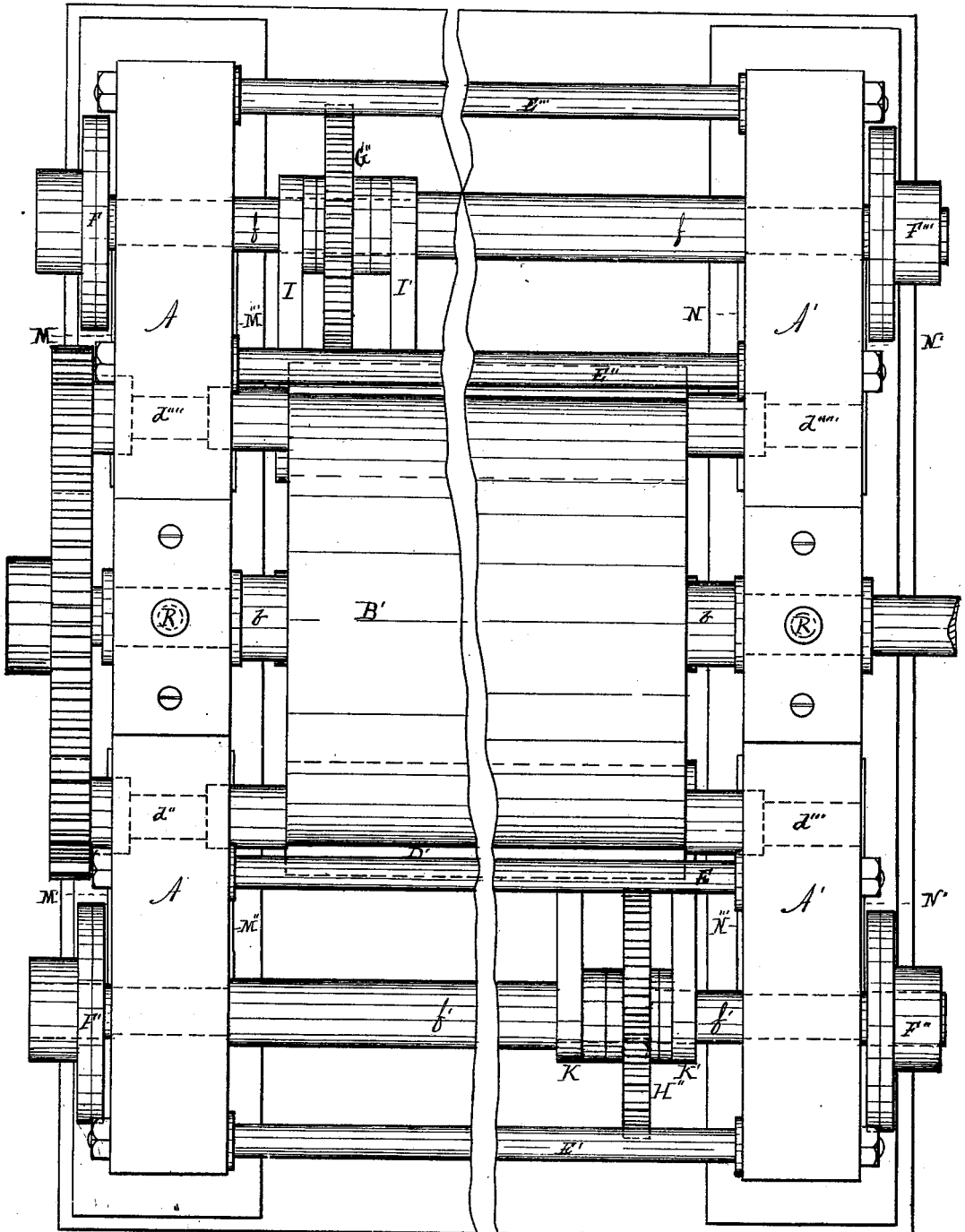
Figure 2:
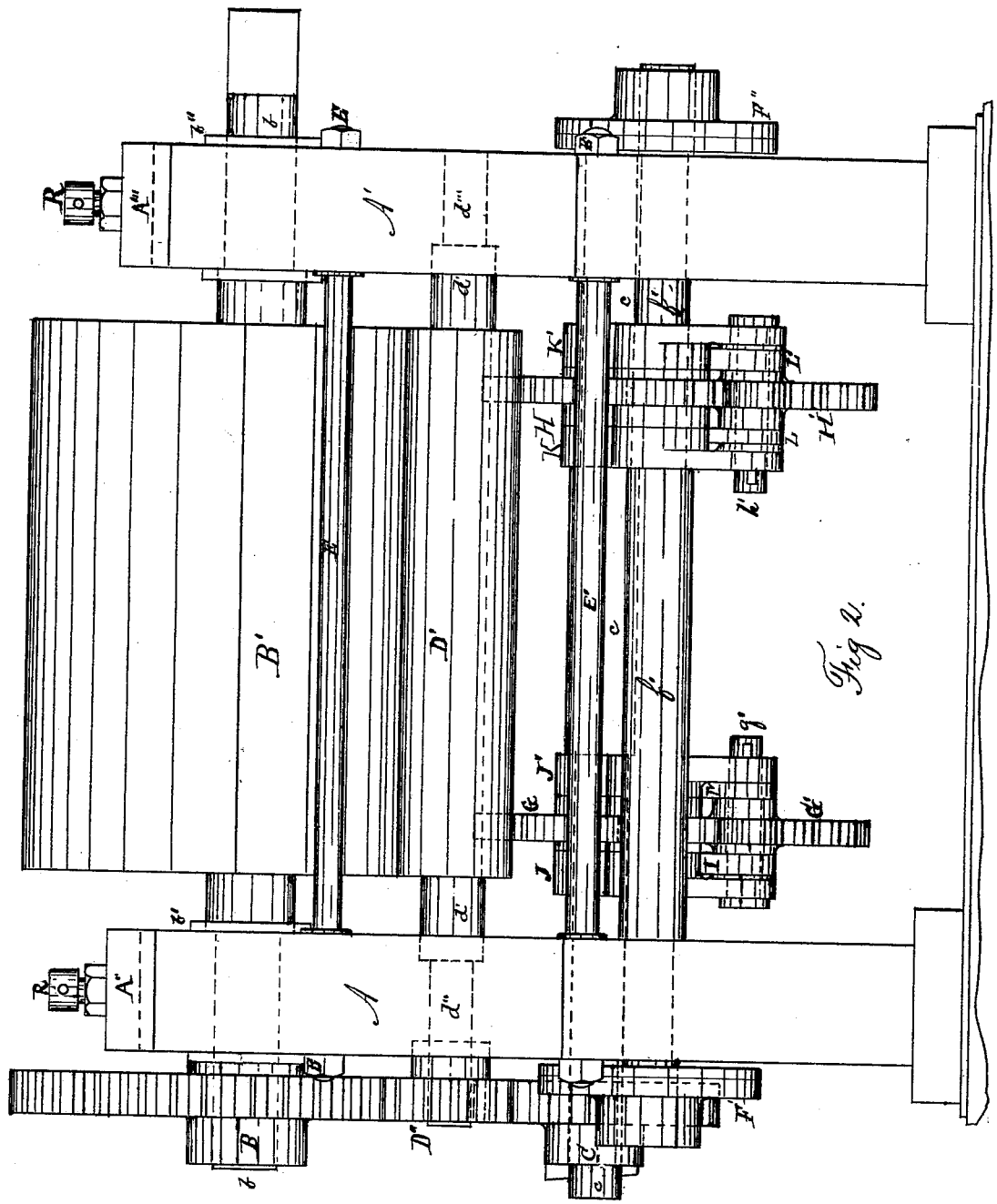

Figure 1 is a plan view. Fig. 2 is an end view. Fig. 3 is a side view, looking toward the outside of frame A. Fig. 4 is a central section, looking toward the inside of frame A. Fig. 5 is a section through cam F and shoe P' on a plane passing through the diameter of F and the axis of drum B', (see Fig. 4,) showing, also, adjacent parts. Fig. 6 is a cross-section of the frame A in part, and also of shaft $f$, showing, also, a part section of shoe P', with a portion of the face of cam F in full lines and a portion in dotted lines.

A A' are the side frames, secured to a bed-plate in the usual manner. They support the several shafts, with the central drum, printing-rolls, and gears, and other parts of the mechanism. $b$ is the main shaft, supported on the side frames A A', near their tops, in adjustable bearings. This shaft carries, outside of the side frame A, a large gear, B, and between the side frames it carries a large drum, B', covered by felt or some pliable material. Both the gear and drum are keyed to this shaft. $c$ is a shaft located under shaft $b$. It carries a smaller gear, C, keyed to it outside of frame A, which meshes into large gear B. Between the side frames by which $c$ is supported in bearings are fixed to it two gears of the same diameter as gear C, one each side of the central line, between the frames. $d$ $d'$ are shafts carrying fixed to them small gears D and D'', Fig. 3, outside of frame A, which mesh into the large or main gear B. Between the side frames are also fixed to shafts $d$ $d'$ engraved print-rolls D' and D''', which revolve in alternate contact with and separation from the fabric carried over the surface of drum B'. The ends of shafts $d$ $d'$ are supported in bearings O O' on the ends of the screw-spindles S S' in the sliding frames $q$ $q'$, which are constructed to slide in the shoes P P'. The shoes P P' rest on the bottoms of pockets Z Z' in the said side frames. The bottoms of said pockets and the bottoms of said shoes are curved to circles struck from the center of main shaft $b$. The said shoes are wider than the frames, and project somewhat below the curve of the said pockets on the inside of frames A A'. On these curved projections are cut screw-threads $t''$ $t'''$, Figs. 4 and 5, which interlock with threads on screws V V', held in bearings $u$ $u'$, so that by turning the screws V V' in either direction the screw-spindles S S' will be moved in the pockets circumferentially to the main shaft $b$ and drum B', and carry with them the print-rolls D' D'''. By this means circumferential adjustment of the print-rolls around the drum B' is accomplished.

The shoes P P' are narrower than the pockets Z Z', so as to permit this circumferential movement.

At the top of the shoes P P', on each side of the frames A A', guides M M' are secured, which guide the motion of the tops of the said shoes circumferentially parallel with their bottoms, so that the bodies of the shoes will move easily and smoothly.

In bearings in the lower part of said shoes are hung the shafts $f f'$, which carry face-cams F F' F'' F''', keyed to them outside the frames A A'. These cams are provided with grooves facing the outside of the frames. Into these grooves $w w'$ project pins $s s'$ from the lower ends of the sliding frames $q q'$.

The screw-spindles S S' are held in the sliding frames $q q'$, and are regulated by adjusting-nuts $r r'$ let into pockets or slots cut through the upper part of the said sliding frames, and through which the said screw-spindles pass. By turning these nuts $r r'$ the said screw-spindles are moved in or out of the sliding frames, and the print-rolls are moved nearer to or farther from the surface of the drum B', to regulate their pressure upon said drum. When the said shafts $f f'$ and the cams revolve they, by their connection with the said sliding frames in the said shoes, by means of the said pins $s s'$, move the said print-rolls toward and away from the drum B' automatically.

On shafts $f f'$, between the side frames, gears G'' and H'' are fixed, of the same size as gear C, and in positions on the said shafts correspondingly opposite to the gears G and H on the shaft $c$.

Suspended by links J J', I I', K K' and L L' on pins $g'$ and $h'$ are two gears, G' and H', which mesh into G and G'' and H and H'', respectively, and continue at all times in such operative connection, irrespective of the distance apart of the gears G and G'' and of H and H''. The said suspension-links control the distance to which the said gears can be separated.

The circumference of rolls D' and D''' is equal to the part of the circumference of B' between the points of contact of the said rolls on the surface of B', or nearly so, in order that the roll D' may begin to print the calico at the exact point at which the roll D''' left off.

It is be observed that the rolls D' and D''' are printing and are drawn away from the material at substantially the same time, although they print alternate portions of the same design on the cloth.

We propose to have the ordinary color-boxes, scrapers, or doctors, and other parts necessary to apply color to the print-rolls when color is used; but it is not important to show and describe their application here, as we do not propose to make any material change in either the parts or the application of the same, since they are well understood in the art.

We have described the mechanism on one side of the machine only for raising and lowering the rolls D' and D'''; but it will be readily understood that the same apparatus is necessary on each end of the roll, as well as cam-shafts to move the rolls properly and to make the proper adjustments.

The operation of our machine is as follows: The cloth or other material to be printed, in colors or otherwise, is drawn from a roll in one continuous sheet and carried between the drum B' and the printing-rolls D' and D'''. The latter, pressing the cloth against the drum B', begin to print their designs or parts of a design on the surface of the cloth at their lines of contact, which are at the same distance apart as the extent of the circumference engraved on each roll D' and D'''. While the drum B' revolves and the cloth moves the entire engraved surfaces of the rolls D' and D''', at one revolution, will transfer their designs to the cloth until the part of the design printed by the roll D' connects with that printed by roll D''' on the surface of the cloth. The rolls D' and D''' are then moved away from the surface of the cloth by means of the cams F F', and it (the fabric) is carried forward a distance equal to the circumference of roll D', or thereabout, when the rolls D' and D''' are again brought up in contact with the cloth, and roll D' begins to print on the fresh surface exactly where D''' stopped printing when it was withdrawn, the rolls again print a design or designs, the entire length of which will be equal to the sum of their circumferences, and the same process is repeated so long as the cloth is carried forward and the drum B' and rolls D' and D''' revolve. Since the cloth is moved forward at the exact speed of the circumference of drum B' whether the printing-rolls are in contact or not, and the movements of the cams, shafts, and rolls are all positive and accurate, being all driven by the drum B' or in connection with it, the printing on the cloth must be accurate and uniform and correspond with the movement of B'.

We do not intend to engrave the entire surface of the rolls D' and D''', but to leave a short space blank to permit them to be carried into contact a little before they are required to begin to print. This we have found to be desirable.

The screws V V' enable us to adjust the rolls to an exact distance apart to insure a perfect continuity of the design, and the pressure of the rolls D' and D''' against the cloth and drum B' can be adjusted at will by the nuts $r r'$.

It will be understood that other rolls continuously in contact with the cloth may be used at the same time with our mechanism, and they may carry any figure or design to be reproduced or repeated continuously at every revolution of said rolls; but our mechanism enables us to print over twice as much surface as with one print-roll before a repetition of the figure is necessary, and if we use three rolls, operated in the same manner, in place of the two, we can extend the design over three times the length of one roll of the same size.

We have considered the whole length of the printed surface made by our mechanism as one design. It is not necessary to do so. Each roll may contain a separate design. The designs will not in that case be repeated as often as when one roll continuously connected is used, but a greater variety can be obtained.

The material to be printed is caused to move forward with the supporting-drum, either by an idler-roll pressing it to the drum, or by printing-rolls continuously in contact with the material and drum, or by the usual belt moved forward at the circumferential speed of the drum between the surface of the drum and the material to be printed.

We are aware that one roll has been arranged to be moved toward and from the supporting-drum to print stripes; but no mechanism that we are aware of has been invented capable of accurately printing from the whole engraved surface of two or more rolls in such a manner that the parts may match, so as to make one continuous design. We do not claim the arrangement or mechanism shown or described in the English Patent No. 49 of 1873.

Having now fully described our joint invention, and the manner in which we have embodied it, what we claim, and desire to secure by Letters Patent, is—

1. The combination, substantially as hereinbefore set forth, of two or more rolls having engraved surfaces with a drum for supporting the material to be printed, connected positively together, the engraved rolls being placed in relation to the supporting-drum, and arranged to move automatically toward and away from the same by mechanism, substantially as described, and to print a continuous design on the material, in the manner and for the purposes set forth.

2. The combination, substantially as hereinbefore set forth, of two or more printing-rolls mounted on shoes, adjustable circumferentially, substantially as described, with cams on a shaft positively connected with the drum which supports the material to be printed, said cams being so connected that they move the print-roll toward and from said drum, for the purpose and in the manner substantially as set forth.

FRANKLIN BAYLIES.
   GEORGE PATTEN SLADE.
   JARVIS MORGAN SLADE.

Witnesses:
 E. L. SHERMAN,
 WM. C. HICKS.